Patented Mar. 11, 1930

1,750,057

UNITED STATES PATENT OFFICE

KARL SCHIRMACHER AND WERNER SCHIRMACHER, OF HOCHST-ON-THE-MAIN, GERMANY, ASSIGNORS TO GENERAL ANILINE WORKS, INC., OF NEW YORK, N. Y., A CORPORATION OF DELAWARE

PROCESS OF PREPARING DIAZOSULPHAMIC ACIDS

No Drawing. Application filed February 17, 1927, Serial No. 169,131, and in Germany February 22, 1926.

Our present invention relates to a new process for producing diazosulphamic acids of the aromatic series.

There have already been proposed several processes for partially diazotizing polyamidated hydrocarbons of the cyclic series and derivatives thereof; but by none of these processes it is possible to carry out the said diazotization in a practical and useful way. When ortho-diamines are treated with nitrous acid azimides are obtained, whereas, meta-diamines give, besides diazo compounds, also tetrazo compounds and bodies formed by self-coupling, and para-diamines give monodiazo compounds, sometimes besides quinones, but only in a very difficult way and with a poor yield.

Now we have found that the monodiazo compounds in question may be obtained in a simple manner and with a good yield by converting the amines into sulphamic acids by means of halogen-sulfonic acids or their esters in presence of a tertiary base and in such a manner that all of the amino groups contain sulfo groups, the products obtained being thereupon treated at a low temperature with nitrous acid the quantity of which corresponds to the amount necessary to diazotize one amino group. One sulfo group is thereby eliminated and mono-diazosulphamic acids are formed in which the other sulfo groups are relatively more firmly fixed so that they can be advantageously used, for instance by coupling them with β-naphthol, for the production of azo dyestuffs which are mostly soluble.

Our new process involves an important technical progress because it permits to convert for instance o-diaminobenzene into diazobenzenesulphamic acids, m-diaminobenzene into m-diazobenzenesulphamic acid, p-diaminobenzene into p-diazobenzenesulphamic acid, 1.5-diaminonaphthalene into 1-diazonaphthalene-5-sulphamic acid and 1.8-diaminonaphthalene into 1-diazo-8-naphthalenesulphamic acid, and likewise bases of the benzidine series into diazodiphenylsulphamic acids. In the same manner may also be converted amidated azo bodies. In the azo dyestuffs produced for instance from the said compounds, the sulfo groups may be split off, for instance by heating them with an acid whereby azo dyestuffs are obtained which seem to be produced from partially diazotized diamines or polyamines. The diazosulphamic acids may also be transformed into a great number of other compounds which otherwise can only be produced with great technical difficulties, by substituting for the diazo residue any other residue, for instance, by heating the aqueous solutions of the diazosulphamic acids in the presence of cuprous chloride, bromide, cyanide, or any other cuprous salt according to the Sandmeyer reaction for the substitution of diazotized amino groups.

The following examples illustrate our invention but they are not intended to limit it thereto, all parts being by weight:

1. 500 parts of dry pyridine are gradually mixed, while cooling, with 130 parts of chlorosulfonic acid and into this mixture are introduced at about 25–30° C. 54 parts of paraphenylenediamine whereupon the whole is heated for about 2 hours to about 60–70° C. The mass is allowed to cool and is introduced into a solution of 200 parts of sodium carbonate in 500 parts of water; the pyridine is expelled by means of steam and the resulting clear reddish-brown solution is filtered. This solution contains the para-phenylenedisulphamic acid in the form of its disodium salt. The acid as well as its salts are, however, readily soluble so much so that it is practically impossible to isolate them. They are very stable towards alkalies, however when heated with acids they undergo retransformation into the original diamine with gradual elimination of the sulfo groups. However, isolation is not required for the preparation of the p-diazobenzenesulphamic acid and the solution may directly be further treated. The solution is cooled with ice, rendered just acid; 120 parts of hydrochloric acid of 20° Bé. are then added thereto whereupon a solution of about 35 parts of sodium nitrite, according to requirement, are run into the mass at 0–5° C. until the absorption of the nitrous acid has almost ceased. The reaction probably occurs according to the following equation:

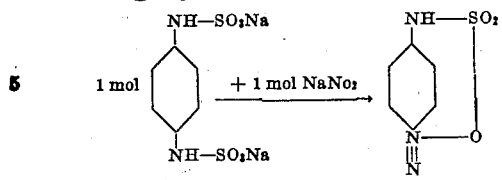

The diazo compound thus obtained is also so readily soluble that it cannot be isolated. By coupling it with, for instance, β-naphthol, a red water-soluble dyestuff is obtained.

2. By replacing the para-phenylenediamine, used in Example 1, by 61 parts of m-toluylenediamine-1.2-4 and carrying out the further operations as indicated in Example 1, the disulphamic acid of 2.4-toluylenediamine is obtained and from the latter the mono-diazo compound of toluylmonosulphamic acid, which contains the diazo group presumably in 4 position and, when coupled with β-naphthol for instance, yields a red water-soluble azo dyestuff. The reaction probably occurs according to the following equation:

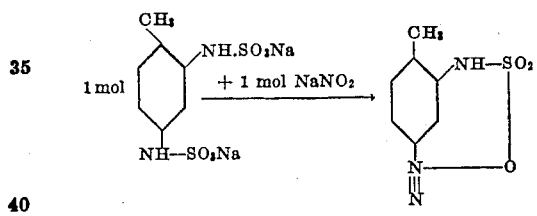

3. By substituting for the para-phenylenediamine used in Example 1, 90 parts of the neutral hydrochloride of orthophenylenediamine and working otherwise as indicated in Example 1, there is obtained by way of the disulphamic acid the o-diazobenzene sulphamic acid which is very readily soluble and when coupled with, for instance β-naphthol, yields a red water-soluble azo dyestuff. The reaction probably occurs according to the following equation:

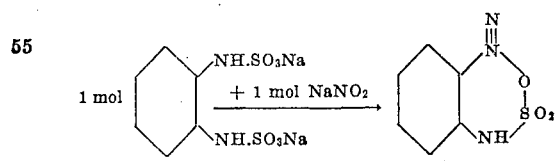

4. In exactly the same manner the corresponding 4.4'-diphenyldisulphamic acid is obtained from 92 parts of benzidine, which acid is considerably more difficultly soluble and the sodium salt of which crystallizes from the solution on cooling. Analysis shows that the product is a disulphamic acid. This disulphamic acid when treated, as indicated in Example 1, with nitrous acid in the cold, yields a diazodiphenylsulphamic acid which partly precipitates and which, when coupled for instance with β-naphthol gives a reddish-violet dyestuff. The reaction probably occurs according to the following equation:

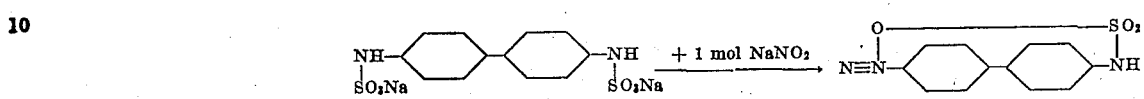

5. By treating 79 parts of 1.5-naphthylenediamine in the same manner as indicated in Example 1, a 1.5-naphthalenedisulphamic acid is formed, the salt of which crystallizes from water and, when treated with nitrous acid, forms a yellow soluble 1-diazonaphthalene-5-sulphamic acid which, when coupled with, for instance, β-naphthol, yields a red, soluble dyestuff. The reaction probably occurs according to the following equation:

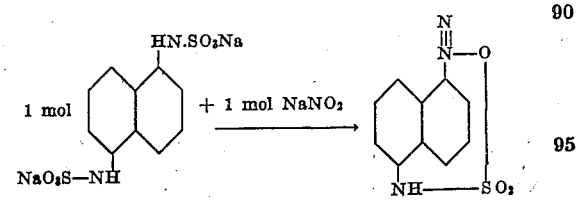

6. When using 79 parts of 1.8-naphthylenediamine and working otherwise as indicated in Example 1, the readily soluble 1.8-disulphamic acid is produced from which, when treated with nitrite in the cold in an acid solution, a diazonaphthalenesulphamic acid is formed which is readily soluble and when coupled with, for instance, β-naphthol, yields a water-soluble red azo dyestuff. The reaction probably occurs according to the following equation:

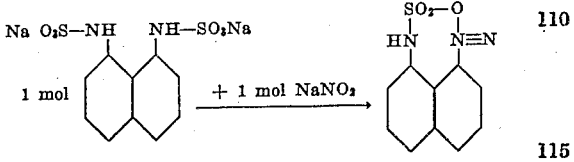

We claim:
1. The process for preparing diazosulphamic acids of the aromatic series, which consists in converting an aromatic diamine by means of an agent capable of splitting off $SO_3$, into the disulphamic acid and treating the latter with nitrous acid, the quantity of which corresponds to the amount necessary to diazotize one amino group.

2. The process of preparing diazoarylsulphamic acids, which consists in treating an arylenedisulphamic acid with nitrous acid, the quantity of which corresponds to the amount necessary to diazotize one amino group.

3. The process of preparing diazoarylsulphamic acids of the benzene series, which consists in treating a disulphamic acid of the benzene series nitrous acid, the quantity of which corresponds to the amount necessary to diazotize one amino group.

4. The process for preparing diazotolylsulphamic acids, which consists in treating a toluylenedisulphamic acid with nitrous acid, the quantity of which corresponds to the amount necessary to diazotize one amino group.

In testimony whereof, we affix our signatures.

KARL SCHIRMACHER.
WERNER SCHIRMACHER.